(12) United States Patent
Lai et al.

(10) Patent No.: US 11,985,330 B2
(45) Date of Patent: May 14, 2024

(54) METHOD AND APPARATUS OF SIMPLIFIED AFFINE SUBBLOCK PROCESS FOR VIDEO CODING SYSTEM

(71) Applicant: MEDIATEK INC., Hsinchu (TW)

(72) Inventors: Chen-Yen Lai, Hsinchu (TW); Tzu-Der Chuang, Hsinchu (TW); Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 250 days.

(21) Appl. No.: 17/601,964

(22) PCT Filed: Apr. 10, 2020

(86) PCT No.: PCT/CN2020/084223
§ 371 (c)(1),
(2) Date: Oct. 7, 2021

(87) PCT Pub. No.: WO2020/207475
PCT Pub. Date: Oct. 15, 2020

(65) Prior Publication Data
US 2022/0210439 A1    Jun. 30, 2022

Related U.S. Application Data

(60) Provisional application No. 62/855,003, filed on May 31, 2019, provisional application No. 62/844,194, (Continued)

(51) Int. Cl.
*H04N 19/00* (2014.01)
*H04N 19/105* (2014.01)
(Continued)

(52) U.S. Cl.
CPC ......... *H04N 19/159* (2014.11); *H04N 19/105* (2014.11); *H04N 19/109* (2014.11); (Continued)

(58) Field of Classification Search
CPC .. H04N 19/159; H04N 19/105; H04N 19/109; H04N 19/12; H04N 19/139;
(Continued)

(56) References Cited

U.S. PATENT DOCUMENTS 10,027,981 B2    7/2018 Xu et al.
10,462,488 B1 *  10/2019 Li ........................ H04N 19/44
(Continued)

FOREIGN PATENT DOCUMENTS

CN    107079161 A    8/2017
CN    108432250 A    8/2018
(Continued)

OTHER PUBLICATIONS

Chinese language office action dated May 19, 2023, issued in application No. CN 202080028241.0.
(Continued)

*Primary Examiner* — Frank F Huang
(74) *Attorney, Agent, or Firm* — McClure, Qualey & Rodack, LLP

(57) ABSTRACT

Methods and apparatus of for video coding using sub-block based affine mode are disclosed. In one method, if affine fallback is used or the control-point motion vectors are the same, the sub-block based affine mode is disabled in order to reduce computational complexity. According to another method for video coding using a coding tool belonging to a coding tool group comprising Prediction Refinement with Optical Flow (PROF) and Bi-Directional Optical Flow (BDOF), predictor refinement is derived for pixels of a target subblock of the current block, where a step to derive the predictor refinement comprises to derive gradients for the pixels of the target subblock of the current block and to right-shift the first gradients by a common shift.

8 Claims, 6 Drawing Sheets

Related U.S. Application Data filed on May 7, 2019, provisional application No. 62/832,941, filed on Apr. 12, 2019.

(51) Int. Cl.

| | |
|---|---|
| *H04N 19/109* | (2014.01) |
| *H04N 19/12* | (2014.01) |
| *H04N 19/139* | (2014.01) |
| *H04N 19/159* | (2014.01) |
| *H04N 19/167* | (2014.01) |
| *H04N 19/172* | (2014.01) |
| *H04N 19/176* | (2014.01) |
| *H04N 19/182* | (2014.01) |
| *H04N 19/61* | (2014.01) |

(52) U.S. Cl.
CPC ........... *H04N 19/12* (2014.11); *H04N 19/139* (2014.11); *H04N 19/167* (2014.11); *H04N 19/172* (2014.11); *H04N 19/176* (2014.11); *H04N 19/182* (2014.11); *H04N 19/61* (2014.11)

(58) Field of Classification Search
CPC .. H04N 19/167; H04N 19/172; H04N 19/176; H04N 19/182; H04N 19/61; H04N 19/54; H04N 19/52; H04N 19/44
See application file for complete search history.

(56) References Cited

U.S. PATENT DOCUMENTS

| | | | |
|---|---|---|---|
| 11,375,226 | B2 | 6/2022 | Chuang et al. |
| 2013/0170540 | A1 | 7/2013 | Damkat et al. |
| 2017/0332095 | A1 | 11/2017 | Zou et al. |
| 2018/0184110 | A1 | 6/2018 | Panusopone et al. |
| 2018/0192069 | A1* | 7/2018 | Chen ...................... H04N 19/52 |
| 2019/0028731 | A1* | 1/2019 | Chuang ................ H04N 19/159 |
| 2019/0058896 | A1* | 2/2019 | Huang ................. H04N 19/159 |
| 2019/0089960 | A1 | 3/2019 | Chen et al. |
| 2019/0110064 | A1* | 4/2019 | Zhang .................... H04N 19/54 |
| 2019/0158870 | A1 | 5/2019 | Xu et al. |
| 2021/0160527 | A1* | 5/2021 | Chuang ................ H04N 19/119 |

FOREIGN PATENT DOCUMENTS

| | | |
|---|---|---|
| CN | 108605137 A | 9/2018 |
| CN | 108781284 A | 11/2018 |
| WO | 2018169989 A1 | 9/2018 |
| WO | 2019010156 A1 | 1/2019 |

OTHER PUBLICATIONS

Luo, J., et al.; "CE2-related: Prediction refinement with optical flow for affine mode;" Joint Video Experts Team (JVET) of ITU-T SG 16 WP 3 and ISO/IEC JTC 1/SC 29/WG 11; Mar. 2019; pp. 1-7.
Extended European Search Report dated Dec. 7, 2022, issued in application No. EP 20787121.1.
Lee, H., et al.; "CE9-related: A simple gradient calculation at the CU boundaries for BDOF;" Joint Video Experts Team (JVET) of ITU-T SG 16 WP 3 and ISO/IEC JTC 1/SC 29/WG 11; Jan. 2019; pp. 1-4.
Chen, C-C., et al.; "BoG report on CE2 sub-block based motion prediction related contributions;" Joint Video Experts Team (JVET) of ITU-T SG 16 WP 3 and ISO/IEC JTC 1/SC 29/WG 11; Mar. 2019; pp. 1-12.
Luo, J., et al.; "CE2-related: Prediction refinement with optical flow for affine mode;" Joint Video Experts Team (JVET) of ITU-T SG 16 WP 3 and ISO/IEC JTC 1/SC 29/WG 11; Mar. 2019; pp. 1-12.
International Search Report dated Jun. 30, 2020, issued in application No. PCT/CN2020/084223.
Huang, H., et al.; "CE2-related: Affine motion compensation using 2x2 subblock" (published on Mar. 27, 2019).
Zhou, M., et al.; "CE2: On restriction of memory bandwidth consumption of affine mode (CE2-4.8)" (published on Mar. 27, 2019).
Xiu, X., et al.; "CE4-related: Harmonization of BDOF and PROF" (published on Jul. 12, 2019).
Galpin, F., et al.; "CE9-related: combination of PROF for affine and BDOF-BWA" (published on Mar. 27, 2019).
Luo, J., et al.; "CE2-related: Prediction refinement with optical flow for affine mode" (published on Mar. 27, 2019).
TW Office Action dated May 20, 2021 in Taiwan application No. 109112213.
Chinese language office action dated Nov. 13, 2023, issued in application No. CN 202080028241.0.

* cited by examiner

METHOD AND APPARATUS OF SIMPLIFIED AFFINE SUBBLOCK PROCESS FOR VIDEO CODING SYSTEM

CROSS REFERENCE TO RELATED APPLICATIONS

The present invention claims priority to U.S. Provisional Patent Application, Ser. No. 62/832,941, filed on Apr. 12, 2019, U.S. Provisional Patent Application, Ser. No. 62/844,194, filed on May 7, 2019 and U.S. Provisional Patent Application, Ser. No. 62/855,003, filed on May 31, 2019. The U.S. Provisional Patent Applications are hereby incorporated by reference in their entireties.

FIELD OF THE INVENTION

The present invention relates to video coding using motion estimation and motion compensation. In particular, the present invention relates to complexity reduction for systems allowing the affine mode and a sub-block based affine mode.

BACKGROUND AND RELATED ART

Various video coding standards have been developed over the past two decades. In newer coding standards, more powerful coding tools are used to improve the coding efficiency. High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

In most coding standards, adaptive Inter/Intra prediction is used on a block basis. In the Inter prediction mode, one or two motion vectors are determined for each block to select one reference block (i.e., uni-prediction) or two reference blocks (i.e., bi-prediction). The motion vector or motion vectors are determined and coded for each individual block. In HEVC, Inter motion compensation is supported in two different ways: explicit signaling or implicit signaling. In explicit signaling, the motion vector for a block (i.e., PU) is signaled using a predictive coding method. The motion vector predictors correspond to motion vectors associated with spatial and temporal neighbors of the current block. After a MV predictor is determined, the motion vector difference (MVD) is coded and transmitted. This mode is also referred as AMVP (advanced motion vector prediction) mode. In implicit signaling, one predictor from a candidate predictor set is selected as the motion vector for the current block (i.e., PU). Since both the encoder and decoder will derive the candidate set and select the final motion vector in the same way, there is no need to signal the MV or MVD in the implicit mode. This mode is also referred as Merge mode. The forming of predictor set in Merge mode is also referred as Merge candidate list construction. An index, called Merge index, is signaled to indicate the predictor selected as the MV for current block.

Motion occurs across pictures along temporal axis can be described by a number of different models. Assuming A(x, y) be the original pixel at location (x, y) under consideration, A' (x',y') be the corresponding pixel at location (x',y') in a reference picture for a current pixel A(x, y), the affine motion models are described as follows.

The affine model is capable of describing two-dimensional block rotations as well as two-dimensional deformations to transform a square (or rectangles) into a parallelogram. This model can be described as follows:

$$x' = a_0 + a_1 \times x + a_2 \times y, \text{ and}$$

$$y' = b_0 + b_1 \times x + b_2 \times y. \quad (1)$$

In contribution ITU-T13-SG16-C1016 submitted to ITU-VCEG (Lin, et al., "Affine transform prediction for next generation video coding", ITU-U, Study Group 16, Question Q6/16, Contribution C1016, September 2015, Geneva, CH), a four-parameter affine prediction is disclosed, which includes the affine Merge mode. When an affine motion block is moving, the motion vector field of the block can be described by two control point motion vectors or four parameters as follows, where (vx, vy) represents the motion vector $$\begin{cases} x' = ax + by + e \\ y' = -bx + ay + f \\ vx = x - x' \\ vy = y - y' \end{cases} \Rightarrow \begin{cases} vx = (1-a)x - by - e \\ vy = (1-a)y + bx - f \end{cases} \quad (2)$$

An example of the four-parameter affine model is shown in FIG. 1A, where a corresponding reference block 120 for the current block 110 is located according to an affine model with two control-point motion vectors (i.e., $v_0$ and $v_1$). The transformed block is a rectangular block. The motion vector field of each point in this moving block can be described by the following equation:

$$\begin{cases} v_x = \dfrac{(v_{1x} - v_{0x})}{w} x - \dfrac{(v_{1y} - v_{0y})}{w} y + v_{0x} \\ v_y = \dfrac{(v_{1y} - v_{0y})}{w} x + \dfrac{(v_{1x} - v_{0x})}{w} y + v_{0y} \end{cases} \quad (3)$$

or $$\begin{cases} v_x = \dfrac{(v_{1x} - v_{0x})}{w} x - \dfrac{(v_{2x} - v_{0x})}{h} y + v_{0x} \\ v_y = \dfrac{(v_{1y} - v_{0y})}{w} x + \dfrac{(v_{2y} - v_{0y})}{h} y + v_{0y} \end{cases} \quad (4)$$

In the above equations, $(v_{0x}, v_{0y})$ is the control point motion vector (i.e., $v_0$) at the upper-left corner of the block, and $(v_{1x}, v_{1y})$ is another control point motion vector (i.e., $v_1$) at the upper-right corner of the block. When the MVs of two control points are decoded, the MV of each 4×4 block of the block can be determined according to the above equation. In other words, the affine motion model for the block can be specified by the two motion vectors at the two control points. Furthermore, while the upper-left corner and the upper-right corner of the block are used as the two control points, other two control points may also be used. An example of motion vectors for a current block can be determined for each 4×4 sub-block based on the MVs of the two control points as shown in FIG. 1B according to equation (3).

In addition, four variable can be defined as follow:

dHorX=$(v_{1x}-v_{0x})/w \rightarrow \Delta Vx$ when shifting 1 sample in X-direction, dVerX=$(v_{1y}-v_{0y})/h \rightarrow \Delta Vy$ when shifting 1 sample in X-direction, dHorY=$(v_{2x}-v_{0x})/w \rightarrow \Delta Vx$ when shifting 1 sample in Y-direction, dVerY=$(v_{2y}-v_{0y})/h \rightarrow \Delta Vy$ when shifting 1 sample in Y-direction.

In contribution ITU-T13-SG16-C1016, for an Inter mode coded CU, an affine flag is signaled to indicate whether the affine Inter mode is applied or not when the CU size is equal to or larger than 16×16. If the current block (e.g., current CU) is coded in affine Inter mode, a candidate MVP pair list is built using the neighbor valid reconstructed blocks. FIG. 2 illustrates the neighboring block set used for deriving the corner derived affine candidate. As shown in FIG. 2, the $\bar{v}_0$ corresponds to motion vector of the block V0 at the upper-left corner of the current block 210, which is selected from the motion vectors of the neighboring block a0 (referred as the above-left block), a1 (referred as the inner above-left block) and a2 (referred as the lower above-left block), and the $\bar{v}_1$ corresponds to motion vector of the block V1 at the upper-right corner of the current block 210, which is selected from the motion vectors of the neighboring block b0 (referred as the above block) and b1 (referred as the above-right block).

In contribution ITU-T13-SG16-C1016, an affine Merge mode is also proposed. If the current block is a Merge coded PU, the neighboring five blocks (A0, A1, B0, B1 and B2 blocks in FIG. 3) are checked to determine whether any of them is coded in affine Inter mode or affine Merge mode. If yes, an affine_flag is signaled to indicate whether the current PU is affine mode. When the current PU is applied in affine merge mode, it gets the first block coded with affine mode from the valid neighbor reconstructed blocks. The selection order for the candidate block is from left block (A1), above block (B1), above-right block (B0), left-bottom block (A0) to above-left block (B2). In other words, the search order is A1→B1→B0→A0→B2 as shown in FIG. 3. The affine parameters of the affine coded blocks are used to derive the $v_0$ and $v_1$ for the current PU. In the example of FIG. 3, the neighboring blocks (A0, A1, B0, B1, and B2) used to construct the control point MVs for affine motion model are referred as a neighboring block set in this disclosure.

In affine motion compensation (MC), the current block is divided into multiple 4×4 sub-blocks. For each sub-block, the center point (2, 2) is used to derive a MV by using equation (3) for this sub-block. For the MC of this current, each sub-block performs a 4×4 sub-block translational MC.

In HEVC, the decoded MVs of each PU are down-sampled with a 16:1 ratio and stored in the temporal MV buffer for the MVP derivation of the following frames. For a 16×16 block, only the top-left 4×4 MV is stored in the temporal MV buffer and the stored MV represents the MV of the whole 16×16 Block.

Affine Optical Flow

When the coding unit (CU) is coded with affine mode, the coding unit is partitioned into 4×4 subblocks and for each subblock, one motion vector is derived based on the affine model and motion compensation is performed to generate the corresponding predictors as shown in FIG. 1B. The reason of using 4×4 block as one subblock, instead of using other smaller size, is to achieve a good trade-off between the computational complexity of motion compensation and coding efficiency. In order to improve the coding efficiency, several methods are disclosed in JVET-N0236 (J. Luo, et al., "CE2-related: Prediction refinement with optical flow for affine mode", Joint Video Experts Team (JVET) of ITU-T SG 16 WP 3 and ISO/IEC JTC 1/SC 29/WG 11, 14th Meeting: Geneva, CH, 19-27 Mar. 2019, Document: JVET-N0236), JVET-N0261 (K. Zhang, et al., "CE2-1.1: Interweaved Prediction for Affine Motion Compensation", Joint Video Experts Team (JVET) of ITU-T SG 16 WP 3 and ISO/IEC JTC 1/SC 29/WG 11, 14th Meeting: Geneva, CH, 19-27 Mar. 2019, Document: JVET-N0261), and JVET-N0262 (H. Huang, et al., "CE9-related: Disabling DMVR for non equal weight BPWA", Joint Video Experts Team (JVET) of ITU-T SG 16 WP 3 and ISO/IEC JTC 1/SC 29/WG 11, 14th Meeting: Geneva, CH, 19-27 Mar. 2019, Document: JVET-N0262).

In JVET-N0236, to achieve a finer granularity of motion compensation, the contribution proposes a method to refine the sub-block based affine motion compensated prediction with optical flow. After the sub-block based affine motion compensation is performed, luma prediction sample is refined by adding a difference derived by the optical flow equation. The proposed Prediction Refinement with Optical Flow (PROF) is described as the following four steps. Step 1), the sub-block-based affine motion compensation is performed to generate sub-block prediction I(i,j). Step 2), the spatial gradients $g_x(i,j)$ and $g_y(i,j)$ of the sub-block prediction are calculated at each sample location using a 3-tap filter [−1, 0, 1].

$$g_x(i,j)=I(i+1,j)-I(i-1,j), \text{ and}$$

$$g_y(i,j)=I(i,j+1)/(i,j-1).$$

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided. Step 3), the luma prediction refinement is calculated by the optical flow equation.

$$\Delta I(i,j)=g_x(i,j)\times\Delta v_x(i,j)+g_y(i,j)\times\Delta v_y(i,j)$$

where the $\Delta v(i,j)$ is the difference between pixel MV computed for sample location (i,j), denoted by v(i,j), and the sub block MV, denoted as $v_{SB}$ (412), of the sub-block 420 of block 410 to which pixel (i,j) belongs, as shown in FIG. 4. In FIG. 4, sub-block 422 corresponds to a reference sub-block for sub-block 420 as pointed by the motion vector $v_{SB}$ (412). The reference sub-block 422 represents a reference sub-block resulted from translational motion of block 420. Reference sub-block 424 corresponds to a reference sub-block with PROF. The motion vector for each pixel is refined by $\Delta v(i,j)$. For example, the refined motion vector v(i,j) 414 for the top-left pixel of the sub-block 420 is derived based on the sub-block MV $v_{SB}$ (412) modified by $\Delta v(i,j)$ 416.

Since the affine model parameters and the pixel locations relative to the sub-block center are not changed from sub-block to sub-block, $\Delta v(i,j)$ can be calculated for the first sub-block, and reused for other sub-blocks in the same CU. Let x and y be the horizontal and vertical offset from the pixel location to the center of the sub-block, $\Delta v(x, y)$ can be derived by the following equation, $$\begin{cases} \Delta v_x(x,y) = c \times x + d \times y \\ \Delta v_y(x,y) = e \times x + f \times y \end{cases}.$$

For 4-parameter affine model, parameters c and e can be derived as:

$$\begin{cases} c = f = \dfrac{v_{1x} - v_{0x}}{w} \\ e = -d = \dfrac{v_{1y} - v_{0y}}{w} \end{cases}.$$

For 6-parameter affine model, parameters c, d, e and f can be derived as:

$$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}.$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU. Step 4), finally, the luma prediction refinement is added to the sub-block prediction I (i,j). The final prediction I' is generated as the following equation.

$$I'(i,j) = I(i,j) + \Delta I(i,j).$$

In JVET-N0261, another sub-block based affine mode, interweaved prediction, was proposed in FIG. 5. With the interweaved prediction, a coding block 510 is divided into sub-blocks with two different dividing patterns (520 and 522). Then two auxiliary predictions ($P_0$ 530 and $P_1$ 532) are generated by affine motion compensation with the two dividing patterns. The final prediction 540 is calculated as a weighted-sum of the two auxiliary predictions (530 and 532). To avoid motion compensation with 2×H or W×2 block size, the interweaved prediction is only applied to regions where the size of sub-blocks is 4×4 for both the two dividing patterns as shown in FIG. 6.

According to the method disclosed in JVET-N0261, the 2×2 subblock based affine motion compensation is only applied to uni-prediction of luma samples and the 2×2 subblock motion field is only used for motion compensation. The storage of motion vector field for motion prediction etc., is still 4×4 subblock based. If the bandwidth constrain is applied, the 2×2 subblock based affine motion compensation is disabled when the affine motion parameters do not satisfy certain criterion.

In JVET-N0273 (H. Huang, et al., "CE9-related: Disabling DMVR for non equal weight BPWA", Joint Video Experts Team (JVET) of ITU-T SG 16 WP 3 and ISO/IEC JTC 1/SC 29/WG 11, 14th Meeting: Geneva, CH, 19-27 Mar. 2019, Document: JVET-N0262), the 2×2 subblock based affine motion compensation is only applied to uni-prediction of luma samples and the 2×2 subblock motion field is only used for motion compensation. If bandwidth constrain is applied, the 2×2 subblock based affine motion compensation is disabled when the affine motion parameters don't satisfy certain criterion.

Bi-directional Optical Flow (BIO)

Bi-directional optical flow (BIO) is a motion estimation/compensation technique disclosed in JCTVC-C204 (E. Alshina, et al., *Bi-directional optical flow*, Joint Collaborative Team on Video Coding (JCT-VC) of ITU-T SG 16 WP 3 and ISO/IEC JTC 1/SC 29/WG 11, 3rd Meeting: Guangzhou, CN, 7-15 October, 2010, Document: JCTVC-C204) and VCEG-AZ05 (E. Alshina, et al., *Known tools performance investigation for next generation video coding*, ITU-T SG 16 Question 6, Video Coding Experts Group (VCEG), 52nd Meeting: 19-26 Jun. 2015, Warsaw, Poland, Document: VCEG-AZ05). BIO derived the sample-level motion refinement based on the assumptions of optical flow and steady motion as shown in FIG. 7, where a current pixel 722 in a B-slice (bi-prediction slice) 720 is predicted by one pixel in reference picture 0 (730) and one pixel in reference picture 1 (710). As shown in FIG. 7, the current pixel 722 is predicted by pixel B (712) in reference picture 1 (710) and pixel A (732) in reference picture 0 (730). In FIG. 7, $v_x$ and $v_y$ are pixel displacement vector in the x-direction and y-direction, which are derived using a bi-direction optical flow (BIO) model. It is applied only for truly bi-directional predicted blocks, which is predicted from two reference pictures corresponding to the previous picture and the latter picture. In VCEG-AZ05, BIO utilizes a 5×5 window to derive the motion refinement of each sample. Therefore, for an N×N block, the motion compensated results and corresponding gradient information of an (N+4)×(N+4) block are required to derive the sample-based motion refinement for the N×N block. According to VCEG-AZ05, a 6-Tap gradient filter and a 6-Tap interpolation filter are used to generate the gradient information for BIO. Therefore, the computational complexity of BIO is much higher than that of traditional bi-directional prediction. In order to further improve the performance of BIO, the following methods are proposed.

In a conventional bi-prediction in HEVC, the predictor is generated using the following equation, where $P^{(0)}$ and $P^{(1)}$ are the list0 and list1 predictor, respectively.

$$P_{Conventional}[i,j] = (P^{(0)}[i,j] + P^{(1)}[i,j] + 1) >> 1$$

In JCTVC-C204 and VECG-AZ05, the BIO predictor is generated using the following equation:

$$P_{OpticalFlow} = (P^{(0)}[i,j] + P^{(1)}[i,j] + v_x[i,j](I_x^{(0)} - I_x^{(1)}[i,j]) + v_y[i,j](I_y^{(0)} - I_y^{(1)}[i,j]) + 1) >> 1$$

In the above equation, $I_x^{(0)}$ and $I_x^{(1)}$ represent the x-directional gradient in list0 and list1 predictor, respectively; $I_y^{(0)}$ and $I_y^{(1)}$ represent the y-directional gradient in list0 and list1 predictor, respectively; $v_x$ and $v_y$ represent the offsets or displacements in x- and y-direction, respectively. The derivation process of $v_x$ and $v_y$ is shown in the following. First, the cost function is defined as diffCost(x, y) to find the best values $v_x$ and $v_y$. In order to find the best values $v_x$ and $v_y$ to minimize the cost function, diffCost(x, y), one 5×5 window is used. The solutions of $v_x$ and $v_y$ can be represented by using $S_1$, $S_2$, $S_3$, $S_5$, and $S_6$.

$$\begin{aligned} \text{diffCost}(x,y) &= \sum_{\Omega}\left(P^0(x,y) + v_x\frac{\partial P^0(x,y)}{\partial x} + v_y\frac{\partial P^0(x,y)}{\partial y} - \right.\\ &\quad \left.\left(P^1(x,y) - v_x\frac{\partial P^1(x,y)}{\partial x} - v_y\frac{\partial P^1(x,y)}{\partial y}\right)\right)^2, \\ &= \sum_{\Omega}\left(P^0(x,y) - P^1(x,y) + v_x\left(\frac{\partial P^0(x,y)}{\partial x} + \frac{\partial P^1(x,y)}{\partial x}\right) + \right. \end{aligned}$$

-continued $$v_y\left(\frac{\partial P^0(x,y)}{\partial y} + \frac{\partial P^1(x,y)}{\partial y}\right)\right)^2.$$

The minimum cost function, mindiffCost(x, y) can be derived according to:

$$\frac{\partial diffCost(x,y)}{\partial v_x} = 0, \frac{\partial diffCost(x,y)}{\partial v_y} = 0.$$

By solving equations (3) and (4), $v_x$ and $v_y$ can be solved according to the following equation:

$$v_x = \frac{S_3 S_5 - S_2 S_6}{S_1 S_5 - S_2 S_2}, v_y = \frac{S_1 S_6 - S_3 S_2}{S_1 S_5 - S_2 S_2}$$

where, $$S_1 = \sum_\Omega \left(\frac{\partial P^0(x,y)}{\partial x} + \frac{\partial P^1(x,y)}{\partial x}\right)^2,$$

$$S_2 = \sum_\Omega \left(\frac{\partial P^0(x,y)}{\partial x} + \frac{\partial P_1(x,y)}{\partial x}\right)\left(\frac{\partial P^0(x,y)}{\partial y} + \frac{\partial P^1(x,y)}{\partial y}\right)$$

$$S_3 = -\sum_\Omega \left(\frac{\partial P^0(x,y)}{\partial x} + \frac{\partial P^1(x,y)}{\partial x}\right)(P^0(x,y) - P^1(x,y)),$$

$$S_5 = \sum_\Omega \left(\frac{\partial P_0(x,y)}{\partial y} + \frac{\partial P_1(x,y)}{\partial y}\right)^2$$

$$S_6 = -\sum_\Omega \left(\frac{\partial P_0(x,y)}{\partial y} + \frac{\partial P_1(x,y)}{\partial y}\right)(P_0(x,y) - P_1(x,y)).$$

In the above equations, $$\frac{\partial P^0(x,y)}{\partial x}$$

corresponds to the x-direction gradient of a pixel at (x,y) in the list 0 picture, $$\frac{\partial P^1(x,y)}{\partial x}$$

corresponds to the x-direction gradient of a pixel at (x,y) in the list 1 picture, $$\frac{\partial P_0(x,y)}{\partial y}$$

corresponds to the y-direction gradient of a pixel at (x,y) in the list 0 picture, and $$\frac{\partial P^1(x,y)}{\partial y}$$

corresponds to the y-direction gradient of a pixel at (x,y) in the list 1 picture.

In some related art, the $S_2$ can be ignored, and $v_x$ and $v_y$ can be solved according to $$v_x = \frac{S_3}{S_1}, v_y = \frac{S_{65} - v_x S_2}{S_5}$$

where, $$S_1 = \sum_\Omega \left(\frac{\partial P^0(x,y)}{\partial x} + \frac{\partial P^1(x,y)}{\partial x}\right)^2,$$

$$S_2 = \sum_\Omega \left(\frac{\partial P^0(x,y)}{\partial x} + \frac{\partial P_1(x,y)}{\partial x}\right)\left(\frac{\partial P^0(x,y)}{\partial y} + \frac{\partial P^1(x,y)}{\partial y}\right)$$

$$S_3 = -\sum_\Omega \left(\frac{\partial P^0(x,y)}{\partial x} + \frac{\partial P^1(x,y)}{\partial x}\right)(P^0(x,y) - P^1(x,y)),$$

$$S_5 = \sum_\Omega \left(\frac{\partial P_0(x,y)}{\partial y} + \frac{\partial P_1(x,y)}{\partial y}\right)^2$$

$$S_6 = -\sum_\Omega \left(\frac{\partial P_0(x,y)}{\partial y} + \frac{\partial P_1(x,y)}{\partial y}\right)(P_0(x,y) - P_1(x,y))$$

We can find that the required bit-depth is large in BIO process, especially for calculating $S_1$, $S_2$, $S_3$, $S_5$, and $S_6$ For example, if the bit-depth of pixel value in video sequences is 10 bits and the bit-depth of gradients is increased by fractional interpolation filter or gradient filter, then 16 bits are required to represent one x-directional gradient or one y-directional gradient. These 16 bits may be further reduced by gradient shift equal to 4, so one gradient needs 12 bits to represent the value. Even if the magnitude of gradient can be reduced to 12 bits by gradient shift, the required bit-depth of BIO operations is still large. One multiplier with 13 bits by 13 bits is required to calculate $S_1$, $S_2$, and $S_5$. And another multiplier with 13 bits by 17 bits is required to get $S_3$, and $S_6$. When the window size is large, more than 32 bits are required to represent $S_1$, $S_2$, $S_3$, $S_5$, and $S_6$.

BRIEF SUMMARY OF THE INVENTION

Methods and apparatus of video coding performed by a video encoder or a video decoder that utilizes a coding tool set comprising an affine mode and a sub-block based affine mode are disclosed. According to this method, input data related to a current block are received at a video encoder side or a video bitstream corresponding to compressed data including the current block is received at a video decoder side, where the affine mode and the sub-block based affine mode are allowed for the current block. Whether one or more conditions are satisfied are determined for the current block. If said one or more conditions are satisfied for the current block, the sub-block based affine mode is disabled for the current block and the current block is encoded or decoded using a modified coding tool set without the sub-block based affine mode.

In one embodiment, the conditions comprise a target condition corresponding to an affine fallback mode being selected for the current block. In another embodiment, when the current block uses a 4-parameter affine model, the conditions comprise a target condition corresponding to a first control-point motion vector at top-left location of the current block equal to a second control-point motion vector at top-right location of the current block. In yet another embodiment, when the current block uses a 6-parameter affine model, the conditions comprise a target condition corresponding to a first control-point motion vector at top-left location of the current block equal to a second control-point motion vector at top-right location of the current block and the first control-point motion vector at the top-left location of the current block equal to a third control-point motion vector at bottom-left location of the current block.

In one embodiment, the sub-block based affine mode corresponds to Prediction Refinement with Optical Flow (PROF) mode.

In one embodiment, the current block is encoded or decoded using the affine mode if the conditions are satisfied for the current block.

According to another method for video coding using a coding tool belonging to a coding tool group comprising Prediction Refinement with Optical Flow (PROF) and Bi-Directional Optical Flow (BDOF), predictor refinement is derived for pixels of a target subblock of the current block. The derivation of the predictor refinement comprises deriving gradients for the pixels of the target subblock of the current block and right-shifting the gradients by a common shift. A refined subblock predictor is then generated according to the predictor refinement and a subblock predictor is generated by subblock motion vector. The target subblock is encoded or decoded based on the refined subblock predictor. In one embodiment, the number of shifts is equal to 6.

DETAILED DESCRIPTION OF THE INVENTION

Figure 1A:
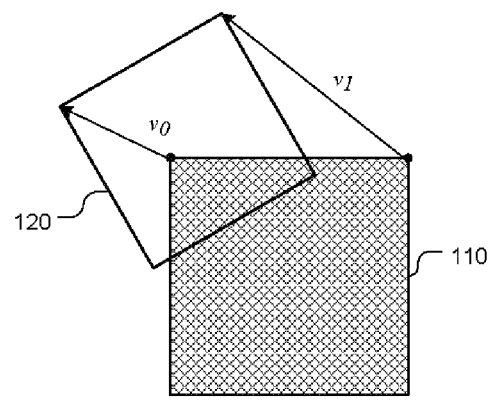
FIG. 1A illustrates an example of the four-parameter affine model, where the transformed block is still a rectangular block.
Figure 1B:
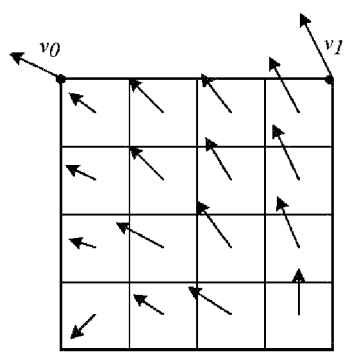
FIG. 1B illustrates an example of motion vectors for a current block determined for each 4×4 sub-block based on the MVs of the two control points.
Figure 2:
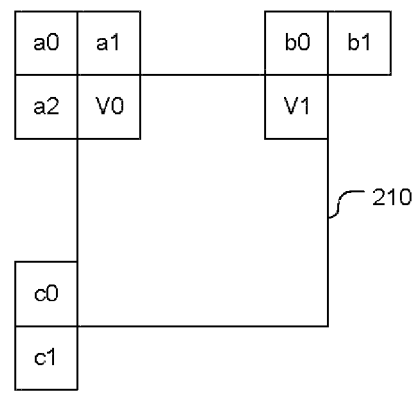
FIG. 2 illustrates the neighboring block set used for deriving the corner derived affine candidate.
Figure 3:
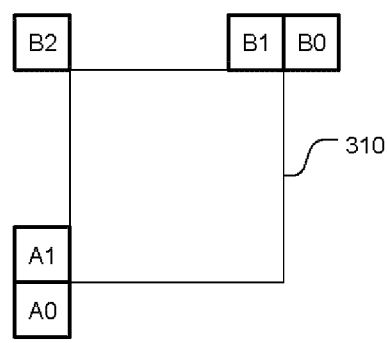
FIG. 3 illustrates the neighboring block set used for deriving the inherited affine candidate.
Figure 4:
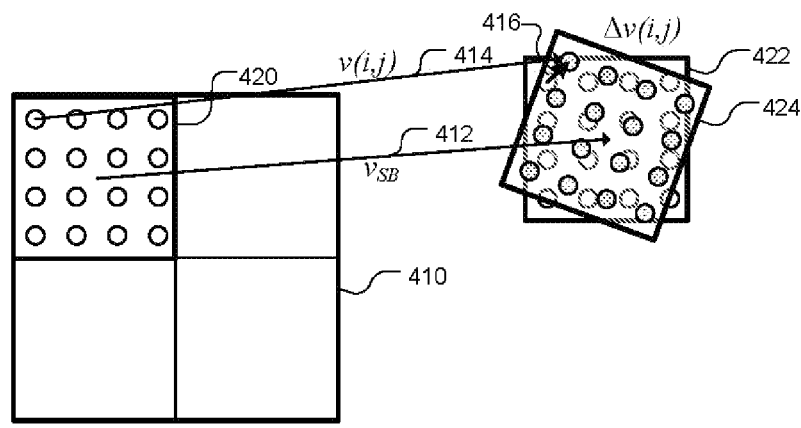
FIG. 4 illustrates an example of sub-block based affine motion compensation, where the motion vectors for individual pixels of a sub-block are derived according to motion vector refinement.
Figure 5:
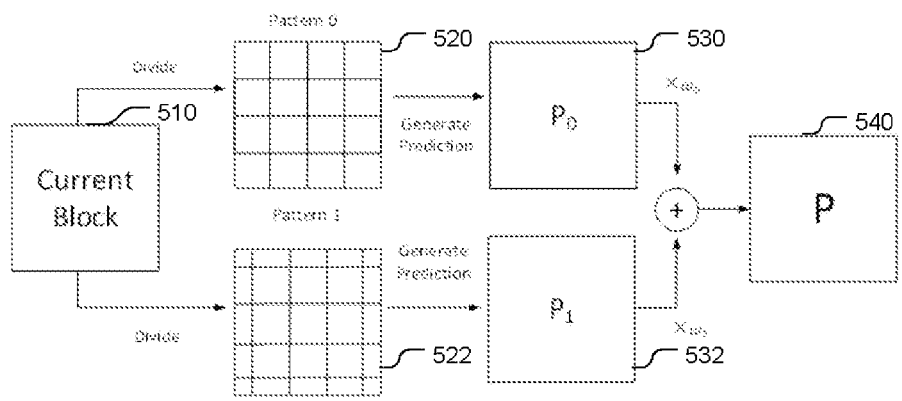
FIG. 5 illustrates an example of interweaved prediction, where a coding block is divided into sub-blocks with two different dividing patterns and then two auxiliary predictions are generated by affine motion compensation with the two dividing patterns.
Figure 6:
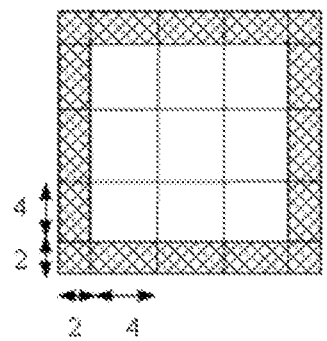
FIG. 6 illustrates an example of avoiding motion compensation with 2×H or W×2 block size for the interweaved prediction, where the interweaved prediction is only applied to regions with the size of sub-blocks being 4×4 for both the two dividing patterns.
Figure 7:
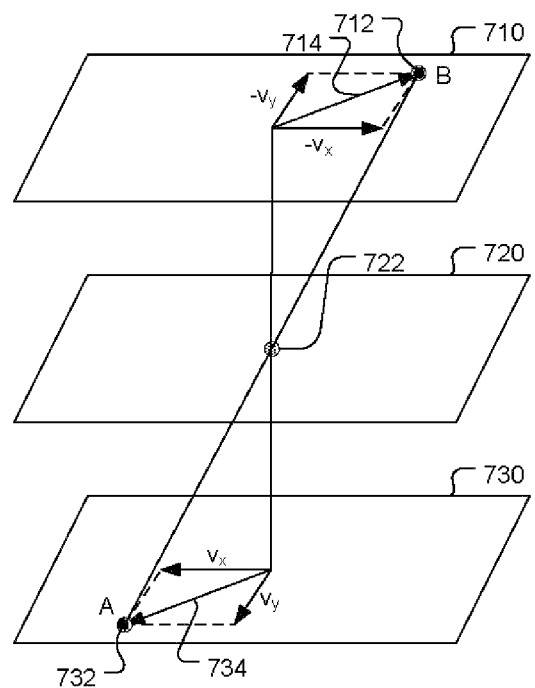
FIG. 7 illustrates an example of motion refinement according to Bi-directional optical flow.

The following description is of the best-contemplated mode of carrying out the invention. This description is made for the purpose of illustrating the general principles of the invention and should not be taken in a limiting sense. The scope of the invention is best determined by reference to the appended claims.

In the present invention, various methods to simplify the sub-block based affine motion compensation are disclosed.

Phase-Variant Affine MC

During the affine MC process, the current block is divided into several N×N (e.g. 4×4) sub-blocks. The block-based translational MC is performed for each sub-block, which means that the affine model is not used under a 4×4 block. In this invention, it is proposed another sub-block based affine mode, a phase-variant affine MC, to utilize the affine model for the MC of a sub-block instead of using translational MC.

Before performing the MC for the affine sub-block, a block MV is first derived. One or more affine MV derivation parameters are derived. For example, the value of DMvHorX, DMvHorY, DMvVerX, and DMvVerY are derived, where DMvHorX and DMvHorY correspond to the respective x- and y-components of difference of two control-point MVs in the horizontal direction, and DMvVerX and DMvVerY correspond to the respective x- and y-components of difference of two control-point MVs in the vertical direction. Similar to the equation (3), the DMvHorX can be set equal to (top_right_CPMVx−top_left_CPMVx)<<(K−log 2BlockWidth) or (top_right_CPMVx−top_left_CPMVx)/width, the DMvHorY can be set equal to (top_right_CPMVy−top_left_CPMVy)<<(K−log 2BlockWidth) or (top_right_CPMVy−top_left_CPMVy)/width. Many of the variables above and in the subsequent specification are self-explanatory. For example, top_right_CPMVx corresponds to the x-component of the top-left control-point MV. When the 4-parameter affine model is used, the DMvVerX can be set as −DmvHorY, the DMvVerY can be set as DMvHorX. When 6-parameter affine model is use, the DMvVerX can be set as (bottom_left_CPMVx−top_left_CPMVx)<<(K−log 2BlockHeight) or (bottom_left_CPMVx−top_left_CPMVx)/height, the DMvVerY can be set as (bottom_left_CPMVy−top_left_CPMVy)<<(K−log 2BlockHeight) or (bottom_left_CPMVy−top_left_CPMVy)/height. K can be 7 or an integer that larger than or equal to the maximum value of log 2BlockWidth and log 2BlockHeight. To derive a MV for a point (x, y) within this block where the x and y are the point position related to the top-left control point MV (top_left_CPMV), the derived MVx can be equal to Round((top_left_CPMVx<<L)+DMvHorX×x+DMvVerX×y+offsetX, M); the derived MVy can be equal to Round((top_left_CPMVy<<L)+DMvHorY×x+DMvVerY×y+offsetY, M). L can be an integer (e.g. 7) or equal to K, M can be an integer (e.g. 7) or equal to K. In the above description, "Round( )" corresponds to the rounding operation.

In conventional affine mode MC, when the sub-block MV is derived, the N×N (e.g. 4×4) block-base translational MC is performed. In this invention, the pixel MV in this N×N sub-block can be different. For example, it is proposed to use different MVx for different rows in this N×N block, and/or use different MVy for different column in this N×N block. In one embodiment, the MVx of each row is derived by using one sample in this row, e.g. the center sample or center point in this row. The MVy of each column is derived by using one sample in this column, e.g. the center sample or center point in this column. In another example, during the interpolation process, in horizontal filtering stage, it is proposed to use different MVx for different rows in this N×N block. For each row, the different MVx can be used for different sample. In vertical filtering stage, different MVy for different column are used in this N×N block. For each column, the different MVy can be used for different samples.

In another embodiment, the MVx and MVy in each row can be derived by adding one or more offset on the original derived sub-block MV. In one example, the MVx of each row can be Round(subblock_MVx×Q+A×DMvVerX+offset, M), where the A can be related to row index. The MVy of each row can be Round(subblock_MVy+B×DMvHorY+offset, M), where the B can be related to the column index. Q can be 128. In the horizontal filtering stage and vertical filtering stage, the filter phase of each row and each column/sample is derived from the MVx and MVy of each row/column/sample.

In one embodiment, not every horizontal row or not every vertical columns needs to derive its phase. Only part of rows or part of columns need to derive its phase. For other rows or columns, the filter phase can be the same as one of the derived phases. For example, for the row index smaller than a first threshold, the MVx is not derived. It can use the MVx of the neighboring row. For example, it can use the MVx of the row index equal to the first threshold. In another example, or the row index larger than a second threshold, the MVx is not derived. It can use the MVx of the neighboring row. For example, use the MVx of the row index equal to the second threshold. Similar method can be applied to the column MVy derivation.

In another embodiment, the M×N sub-block MC can be divided into two parts. The first part uses the horizontal filter to generate an M×O block, where the M can be the sub-block width, O can be the (sub-block height+interpolation filter length−1). The second part uses the vertical filter to filter this M×O block to generate an M×N block of affine predictor. For the first part, O rows of horizontal filters are performed. Each row generates M filtered samples. For each row, the MVy are the same, or the integer part of MVy are the same. The MVy of each row can be set equal to sub-block MVy. The MVx of each row can be Round(subblock_MVx×Q+A×DMvVerX+offset, M), where the A can be related to the row index.

The filter phase of each row can be derived from the MVx of each row, e.g. selecting the filter by the fraction part of MVx. In one example, the MVx of each row can be limited/clipped in a range, e.g. subblock_MVx±1-pel, or in the range of [integer part of subblock_MVx, integer part of subblock_MVx+1-pel], or in the range of [integer part of subblock_MVx, (integer part of subblock_MVx+1-pel−1× K)] where K is ¼-pel, ⅛-pel, 1/16-pel, or 1/32-pel; K can be different for different color components. When the M×O horizontal filtered samples are ready, the vertical filter can be applied. For each column, the MVy can be different. The MVy of each row can be Round(subblock_MVy×Q+B× DMvHorY+offset, M), where the B can be related to the column index. The filter phase of each column can be derived from the MVy of each column, e.g. selecting the filter by the fraction part of MVy. In one example, the MVy of each column can be limited/clipped in a range, e.g. subblock MVy±1-pel, or in the range of [integer part of subblock_MVy, (integer part of subblock_MVy+1-pel)], or in the range of [integer part of subblock_MVy, (integer part of subblock_MVy+1-pel−1×K)] where K is ¼-pel, ⅛-pel, 1/16-pel, or 1/32-pel; K can be different for different color component. In another example, for a vertical filtering column, the input filtered sample should be in the same column in the filtered M×O block. In another example, the MV clipping is not applied. Instead, the sample padding is applied to fill the reference sample that outside of the (sub block height+interpolation filter length−1) filtered samples. In another example, the MVy of each row can be the same as the subblock_MVy.

The rounding can be rounding to zero (e.g. the rounding offset is equal to (1<<(M−1))−1) or rounding away from zero (e.g. the rounding offset is equal to (1<<(M−1))). In another example, the rounding can be directly right-shift without adding the rounding offset. In the proposed method, the number of used interpolation filter is the same as the block-based translational MC. In one embodiment, not every horizontal row or not every vertical columns needs to derive its phase. Only part of rows or part of columns need to derive its phase. For the other rows or columns, the filter phase can be the same as one of the derived phase. For example, for the row index smaller than a first threshold, the MVx is not derived. It can use the MVx of the neighboring row. For example, it can use the MVx of the row index equal to the first threshold. In another example, if the row index is larger than a second threshold, the MVx is not derived. It can use the MVx of the neighboring row. For example, it can use the MVx of the row index equal to the second threshold Similar method can be applied for the column MVy derivation.

In another embodiment, the M×N sub-block MC can be divided into two parts. The first part uses the horizontal filter to generate an M×O block, where the M can be the sub-block width, O can be the (sub-block height+interpolation filter length−1). The second part uses the vertical filter to filter this M×O block to generate an M×N block of affine predictor. For the first part, O rows of horizontal filters are performed. Each row generates M filtered samples. For each row, the MVy are the same, or the integer parts of MVy are the same.

The MVy of each row can be set equal to sub-block MVy. The MVx of each sample can be Round(subblock_MVx× Q+A×DMvVerX+C×DMvHorX+offset, M), where the A can be related to the row index, and C can be related to the column index in the N×N subblock. The filter phase of each sample can be derived from the MVx of each sample, e.g. selecting the filter by the fraction part of MVx. In one example, the MVx of each sample can be limited/clipped in a range, e.g. row_base_MVx±1-pel, or in the range of [integer part of row_base_MVx, (integer part of row_base_MVx+1-pel)], or in the range of [integer part of row_base_MVx, (integer part of row_base_MVx+1-pel−1× K)] where K is ¼-pel, ⅛-pel, 1/16-pel, or 1/32-pel; K can be different for different color component.

The row_base_MVx can be derived by Round(subblockMVx×Q+A×DMvVerX+offset, M) or the MVx derived by the affine model using one position in the row (e.g. the center position of the row). For the required samples of a filter row, at most (sub-block width+interpolation filter length−1) reference samples are required. In one embodiment, the first reference samples of each filter for each sample are consecutive samples, e.g. sub-block width of consecutive samples. For a horizontal filtering row, (sub-block width+interpolation filter length−1) reference samples are used to generate sub-block width of filter samples. In another example, for a horizontal filtering row, the reference sample should be in the same row in the reference picture. In one example, the MVx of each row can be limited/clipped in a range, e.g. subblock_MVx±1-pel, or in the range of [integer part of subblock_MVx, (integer part of subblock_MVx+1-pel)], or in the range of [integer part of subblock_MVx, (integer part of subblock_MVx+1-pel−1× K)] where K is ¼-pel, ⅛-pel, ¹⁄₁₆-pel, or ¹⁄₃₂-pel; K can be different for different color components. In another example, the MV clipping is not applied. Instead, the sample padding is applied to fill the reference sample outside the (sub-block width+interpolation filter length−1) reference samples. When the M×O horizontal filtered samples are ready, the vertical filter can be applied.

For each sample/column, the MVy can be different. The MVy of each sample can be Round(subblock_MVy×Q+B× DMvHorY+D×DMvVerY+offset, M), where the B can be related to the column index, and D can be related to the row index in the N×N subblock. The filter phase of each sample can be derived from the MVy of each sample, e.g. selecting the filter by the fraction part of MVy. In one example, the MVy of each sample can be limited/clipped in a range, e.g. subblock_MVy±1-pel, or in the range of [integer part of subblock_MVy, (integer part of subblock_MVy+1-pel)], or in the range of [integer part of subblock_MVy, (integer part of subblock_MVy+1-pel−1×K)] where K is ¼-pel, ⅛-pel, ¹⁄₁₆-pel, or ¹⁄₃₂-pel; K can be different for different color component. In another example, the MVy of each sample can be limited/clipped in a range, e.g. row_base_MVy±1-pel, or in the range of [integer part of row_base_MVy, (integer part of row_base_MVy+1-pel)], or in the range of [integer part of row_base_MVy, (integer part of row_base_MVy+1-pel−1×K)] where K is ¼-pel, ⅛-pel, ¹⁄₁₆-pel, or ¹⁄₃₂-pel; K can be different for different color component. The row_base_MVy can be derived by Round(subblock_MVy×Q+B×DMvHorY, offset, M), Round(subblock_MVy×Q+D×DMvVerY+offset, M), or the MVy derived by affine model using one position in the column (e.g. the center position of the column).

For the required samples of a filter column, at most (sub-block height+interpolation filter length−1) filtered samples (from the horizontal filtering stage) are required. In one embodiment, the first reference samples of each filter for each sample are consecutive samples, e.g. sub-block height of consecutive samples. For a vertical filtering column, (sub-block height+interpolation filter length−1) filtered samples are used to generate sub-block height of filter samples. In another example, for a vertical filtering column, the input filtered sample should be in the same column in the filtered M×O block.

In another example, the MV clipping is not applied. Instead, the sample padding is applied to fill the reference sample that outside of the sub-block height+interpolation filter length−1 filtered samples. In another example, the MVy of each row can be the same as the subblock_MVy. The rounding can be rounding to zero (e.g. the rounding offset is equal to (1<<(M−1))−1) or rounding away from zero (e.g. the rounding offset is equal to (1<<(M−1))). In another example, the rounding can be directly right-shifting without adding the rounding offset.

In the proposed method, the number of used interpolation filter is the same as the block-based translational MC. In one embodiment, not every horizontal row or not every vertical columns needs to derive its phase. Only part of rows or part of columns need to derive its phase. For the other rows or columns, the filter phase can be the same as one of the derived phase. For example, for the row index smaller than a first threshold, the MVx is not derived. The filter phase of each sample can use the MVx of the filter phase of the neighboring row. For example, use the MVx of the row index equal to the first threshold. In another example, if the row index is larger than a second threshold, the MVx is not derived. It can use the MVx of each sample of the neighboring row. For example, it can use the MVx of the row index equal to the second threshold Similar method can be applied for the column MVy derivation.

Affine Bandwidth Constraint

In order to reduce complexity, according to one embodiment of the present invention, the affine sub-block MC can be fallback to use the block-based translational MC if the DMvHorX, DMvHorY, DMvVerX, and/or DMvVerY is too small. In one embodiment, if DMvVerX is too small, e.g. abs(DMvVerX) is smaller than (or smaller than or equal to) 32, 64, 128, 256, 512, or 1024, the block based horizontal filter is applied, e.g. the MVx are the same (as the sub-block MVx). In another embodiment, if DMvHorY is too small, e.g. abs(DMvHorY) is smaller than (or smaller than or equal to) 32, 64, 128, 256, 512, or 1024, the block-based vertical filter is applied, e.g. the MVy are the same (as the sub-block MVy). In another example, if G×DMvVerX+H×DMvHorX is too small, e.g. abs(G×DMvVerX+H×DMvHorX) is smaller than (or smaller than or equal to) 32, 64, 128, 256, 512, or 1024, the block-based horizontal filter is applied, e.g. the MVx are the same (as the sub-block MVx). In another example, if I×DMvHorY+J×DMvVerY is too small, e.g. abs(I×DMvHorY+J×DMvVerY) is smaller than (or smaller than or equal to) 32, 64, 128, 256, 512, or 1024, the block-based vertical filter is applied, e.g. the MVy are the same (as the sub-block MVy).

In one embodiment, the DMvVerX can be normalized by a number. The number can be related to DMvVerY. For example, DMvVerX=(DMvVerX)/(1+DMvVerY) or DMvVerX=(DMvVerX<<K)/((1<<K)+DMvVerY)). The DMvHorY can be normalized by a number. The number can be related to DMvHorX. For example, DMvHorY=(DMvHorY)/(1+DMvHorX) or DMvHorY=(DMvHorY<<K)/((1<<K)+DMvHorX)).

When MVs of subblocks in one CU are very different, the overlapped region of the required reference block of each subblock is small and a lot of memory bandwidth is required. Therefore, an affine model constraint can be applied according to embodiments of the present invention. For example, a fall back mode can be applied for the affine model, when one or more conditions are satisfied or not satisfied. When the fall back mode is applied, all the subblock MVs are set to the same value. Therefore, the affine coded CU can be treated as a translational moving CU. The whole-CU MC can be applied, and the bandwidth can be reduced. Variables $bxWX_4$, $bxHX_4$, $bxWX_h$, $bxHX_h$, $bxWX_v$ and $bxHXd_v$ are derived as follows:

$$maxW_4 = Max(0, Max(4\times(2048+dHorX), Max(4\times dHorY, 4\times(2048+dHorX)+4\times dHorY)))$$

$$minW_4 = Min(0, Min(4\times(2048+dHorX), Min(4\times dHorY, 4\times(2048+dHorX)+4\times dHorY)))$$

$$maxH_4 = Max(0, Max(4\times dVerX, Max(4\times(2048+dVerY), 4\times dVerX+4\times(2048+dVerY))))$$

$$minH_4 = Min(0, Min(4\times dVerX, Min(4\times(2048+dVerY), 4\times dVerX+4\times(2048+dVerY))))$$

$$bxWX_4 = ((maxW_4 - minW_4) >> 11) + 9$$

$$bxHX_4 = ((maxH_4 - minH_4) >> 11) + 9$$

$$bxWX_h = ((Max(0, 4\times(2048+dHorX)) - Min(0, 4\times(2048+dHorX))) >> 11) + 9$$

$$bxHX_h=((Max(0,4\times dVerX)-Min(0,4\times dVerX))>>11)+9$$

$$bxWX_v=((Max(0,4\times dVerY)-Min(0,4\times dVerY))>>11)+9$$

$$bxHX_v=((Max(0,4\times(2048+dHorY))-Min(0,4\times(2048+dHorY)))>>11)+9$$

In the above equations, varibles dHorX, dHorY, dVerX and dVerY are defined previously. For each reference list, the fallbackMode is derived as follow:
If the bi-prediction is used for the current CU/PU (inter_pred_idc equal to PRED_BI):
If $bxWX_4 \times bxHX_4$ is less than or equal to 225, fallbackModeTriggered is set equal to 0.
Otherwise, the fallbackModeTriggered is set equal to 1.
If the uni-prediction is used for the current CU/PU (inter_pred_idc NOT equal to PRED_BI):
If both $bxWX_h \times bxHX_h$, is less than or equal to 165 and $bxWX_v \times bxHX_v$ is less than or equal to 165, fallbackModeTriggered is set equal to 0.
Otherwise, the fallbackModeTriggered is set equal to 1.

The affine-based motion refinement methods (or can be regarded as sub-block based affine modes) as mentioned above (e.g. affine optical flow, interweaved affine MC, and/or phase variant affine MC) can refine the predictors, however the required computational complexity is huge. The above affine-based motion refinement methods can achieve a better performance, especially when the motion vectors of subblocks in one CU with the same affine model are not very similar. When the motion vectors of subblocks are very similar, the performance of the above methods will be degraded but the required computational complexity is still huge. On the other hand, when MVs of subblocks in one CU are very different, the overlapped region of the required reference block of each subblock is small, a lot of memory bandwidth is required. Therefore, an affine model constraint can be applied. For example, a fall back mode can be applied, when one or more conditions are satisfied or not satisfied.

In order to reduce the computational complexity or reduce the required bandwidth for the affine mode, an early termination algorithm is proposed. The concept is that when affine-based MV refinement methods are allowed and the motion vectors of subblocks in one CU with the same affine model are very close or very different, the above affine-based MV refinement methods are disabled implicitly. In this case, the block-based translational MC or 4×4/8×8/4×8/8×4-block MC is applied.

The condition of disabling the above affine-based MV refinement methods can be dependent on one or a combination of CU width (cuWidth), CU height (cuHeight), control points MVs and/or position of affine model (topLeftMVx, topLeftMVy, topRightMVx, topRightMVy, botLeftMVx, botLeftMVy, botRightMVx, botRightMVy), prediction mode (uni-prediction, bi-prediction, merge mode, AMVP mode, skip mode, inherited affine candidate, constructed affine candidate), residual (cbf, non-zero residual), dHorX, dHorY, dVerX, dverY, or any combination of above, or one or more derived variable that derived from the one or more above values. For example, when abs(topLeftMVx topRightMVx)<cuWidth×ratio, abs(topLeftMVy–topRightMVy)<cuWidth×ratio, abs(topLeftMVx–botLeftMVx)<cuHeight×ratio, abs(topLeftMVy–botLeftMVy)<cuHeight×ratio, |dHorX|<threshold1, |dHorY|<threshold2, |dVerX|<threshold3, and/or |dVerY|<threshold4, or any combination of above, then the above affine-based MV refi- nement methods are disabled. Note that the above equations also cover the case that two or more control-point motion vectors are the same. For example, if the top-left control-point motion vector is the same as the top-right control-point motion vector (i.e., topLeftMVx=topRightMVx and top LeftMVy=topRightMVy), both abs(topLeftMVx topRightMVx)<(cuWidth×ratio) and abs(topLeftMVy–topRightMVy)<(cuWidth×ratio) are satisfied. Similarly, if the top-left control-point motion vector is the same as the bottom-left control-point motion vector (i.e., topLeftMVx=botLeftMVx and topLeftMVy=botLeftMVy), both abs(topLeftMVx–botLeftMVx)<(cuHeight×ratio) and abs(topLeftMVy–botLeftMVy)<(cuHeight×ratio) are satisfied.

The ratio mentioned above can be explicitly signaled at the sequence level, picture level, tile group level, tile level, CTU level, or block level. Or, the ratio is implicitly decided according to video resolution, cuWidth, cuHeight, cuWidth×cuHeight, or prediction direction, affine MV resolution. In another example, when abs(botLeftMVx topRightMVx)<(cuWidth×ratio), and abs(botLeftMVy topRightMVy)<(cuHeight×ratio), the above affine-based MV refinement methods are disabled. In another example, when abs (topLeftMVx topRightMVx)<(cuWidth×ratio), and abs (topLeftMVy–topRightMVy)<(cuHeight×ratio), the above affine-based MV refinement methods are disabled. In another example, when abs(topLeftMVx topRightMVx)+abs(topLeftMVy–topRightMVy)<((cuWidth+cuHeight)×ratio), the above methods are disabled. In another example, when abs(botLeftMVx topRightMVx)+abs(botLeftMVy topRightMVy)<((cuWidth+cuHeight)×ratio), the above affine-based MV refinement methods are disabled. In another example, when abs(topLeftMVx topRightMVx) <tha, abs(topLeftMVy–topRightMVy)<thb, abs (topLeftMVx–botLeftMVx)<thc, and abs(topLeftMVy–botLeftMVy)<thd, then the above affine-based MV refinement methods are disabled. The value of tha, thb, thc, thd, threshold1, threshold2, threshold3, threshold4 can be explicitly signaled at sequence level, picture level, tile group level, tile level, CTU level, or block level. Or the value of tha, thb, thc, thd, threshold1, threshold2, threshold3, threshold4 is implicitly decided according to video resolution, cuWidth, cuHeight, cuWidth×cuHeight, or prediction direction, affine MV resolution.

In another example, when abs(botLeftMVx topRightMVx)<tha, and abs(botLeftMVy topRightMVy)<thb, the above affine-based MV refinement methods are disabled. In another example, when abs(topLeftMVx topRightMVx) <thc, and abs(topLeftMVy–topRightMVy)<thd, the above affine based MV refinement methods are disabled. In another example, when abs(topLeftMVx topRightMVx)+abs (topLeftMVy–topRightMVy)<tha, the above affine-based MV refinement methods are disabled. In another example, when abs(botLeftMVx topRightMVx)+abs(botLeftMVy topRightMVy)<thb, the above methods are disabled. The values of tha and thb can be explicitly signaled at sequence level, picture level, tile group level, tile level, CTU level, or block level. Or the values of tha and thb are implicitly decided according to video resolution, cuWidth, cuHeight, cuWidth×cuHeight, or prediction direction, affine MV resolution. Or only the value of tha is signaled, the value of thb is derived based on tha and cuWidth or cuHeight. In all above cases, the "smaller" conditions or "<" can be replaced by "larger" or ">".

In another embodiment, if the absolute value of a largest MVD within one sub-block, i.e. (LMVDx, LMVDy), is smaller than a threshold, the above affine-based MV refinement methods are disabled. In this case, the MVDs (i.e., the MV differences between pixel MVs and sub-block MVs) in multiple positions of a sub-block can be calculated, i.e. top-left, top-right, bottom-left, bottom-right position of a sub-block. Or only top-left and bottom-right position are calculated. Or only top-right, and bottom-left position are calculated. For example, if |LmVpx|+|LMVDy|<th1, the above methods are disabled. For example, if |LMVDx+LMVDy|<th1, the above affine-based MV refinement methods are disabled. For example, if (LMVDx^2+LMVDy^2)<th1, the above methods are disabled. In another embodiment, if the absolute value of a MVD in the top-left position of an affine model is smaller than a threshold, the above affine-based MV refinement methods are disabled. For example, if |topLeftMVDx|+|topLeftMVDy|<th2, the above methods are disabled. For example, if |topLeftMVDx+topLeftMVDy|<th2, the above affine-based MV refinement methods are disabled. For example, if (topLeftMVDx^2+topLeftMVDy^2)<th2, the above affine-based MV refinement methods are disabled. The values of th1 and th2 can be can be explicitly signaled at sequence level, picture level, tile group level, tile level, CM level, or block level. Or the value of th is implicitly decided according to video resolution, cuWidth, cuHeight, cuWidth×cuHeight, or prediction direction, affine MV resolution. In another embodiment, if the absolute value of a MVD in top-right/bottom-left/bottom-right or any pre-defined position in an affine model can also be used to disable the above methods. In all above cases, the "smaller" conditions or "<" can be replaced by "larger" or ">".

Prior to performing the MC for the affine sub-block, a block MV is first derived. One or more affine MV derivation parameters are derived. For example, the value of DMvHorX, DMvHorY, DMvVerX, and DMvVerY are derived Similar to equation (3), the DMvHorX can be set equal to (top_right_CPMVx−top_left_CPMVx)<<(K−log 2BlockWidth) or (top_right_CPMVx−top_left_CPMVx)/width, the DMvHorY can be set equal to (top_right_CPMVy−top_left_CPMVy)<<(K−log 2BlockWidth) or (top_right_CPMVy−top_left_CPMVy)/width. When the 4-parameter affine model is used, the DMvVerX can be set as−DmvHorY, the DMvVerY can be set as DMvHorX. When 6-parameter affine model is use, the DMvVerX can be set as (bottom_left_CPMVx−top_left_CPMVx)<<(K−log 2BlockHeight) or (bottom_left_CPMVx−top_left_CPMVx)/height, the DMvVerY can be set as (bottom_left_CPMVy−top_left_CPMVy)<<(K−log 2BlockHeight) or (bottom_left_CPMVy−top_left_CPMVy)/height. K can be 7 or an integer larger than or equal to the maximum value of log 2BlockWidth and log 2BlockHeight. The early termination can also be dependent on the intermediate parameters, i.e. DMvHorX, DMvHorY, DMvVerX, and/or DMvVerY. If the DMvHorX, DMvHorY, DMvVerX, and/or DMvVerY is too small, the above methods will be disabled. In one embodiment, if DMvHorX/DMvHorY/DMvVerX/DMvVerY is smaller than (or smaller than or equal to) 32, 64, 128, 256, 512, or 1024. In another embodiment, if (DMvHorX−DMvVerX) and/or (DMvHorY−DMvVerY) is too small, e.g. abs(DMvHorX−DMvVerX) is smaller than (or smaller than or equal to) 32, 64, 128, 256, 512, or 1024, the above methods will be disabled. In another example, if (G×DMvVerX+H×DMvHorX) and/or (I×DMvVerY+J×DMvHorY) is too small, e.g. abs(G×DMvVerX+H×DMvHorY) is smaller than (or smaller than or equal to) 32, 64, 128, 256, 512, or 1024, the above affine-based MV refinement methods will be disabled. The value of G, H, I, J can be explicitly signaled at sequence level, picture level, tile group level, tile level, CTU level, or block level. Or the value of G, H, I, J is implicitly decided according to video resolution, cuWidth, cuHeight, cuWidth×cuHeight, or prediction direction, affine MV resolution. In all above cases, the "smaller" conditions or "<" can be replaced by "larger" or ">".

In one embodiment, when |dHorY|<threshold2 and |dVerX|<threshold3, the affine optical flow, interweaved affine MC, and/or phase variant affine MC are disabled. In one embodiment, when |dHorX|<threshold1, |dHorY|<threshold2, |dVerX|<threshold3, and |dVerY|<threshold4, the affine optical flow, interweaved affine MC, and/or phase variant affine MC are disabled. In another embodiment, when |dHorX|<threshold1, the affine optical flow, interweaved affine MC, and/or phase variant affine MC are disabled. In another embodiment, when |dHorY| <threshold2, the affine optical flow, interweaved affine MC, the horizontal filtering part of phase variant affine MC, and/or phase variant affine MC are disabled. In another embodiment, when |dVerX|<threshold3, the affine optical flow, interweaved affine MC, the vertical filtering part of phase variant affine MC, and/or phase variant affine MC are disabled. In another embodiment, when |dVerY| <threshold4, the affine optical flow, interweaved affine MC, and/or phase variant affine MC are disabled.

In one embodiment, when |dHorY|>threshold2 or |dVerX|>threshold3, the affine optical flow, interweaved affine MC, and/or phase variant affine MC are disabled. In one embodiment, when |dHorX|>threshold1, |dHorY|>threshold2, |dVerX|>threshold3, or |dVerY|>threshold4, the affine optical flow, interweaved affine MC, and/or phase variant affine MC are disabled. In another embodiment, when |dHorX|>threshold1, the affine optical flow, interweaved affine MC, and/or phase variant affine MC are disabled. In another embodiment, when |dHorY|> threshold2, the affine optical flow, interweaved affine MC, the horizontal filtering part of phase variant affine MC, and/or phase variant affine MC are disabled. In another embodiment, when |dVerX|>threshold3, the affine optical flow, interweaved affine MC, the vertical filtering part of phase variant affine MC, and/or phase variant affine MC are disabled. In another embodiment, when |dVerY|> threshold4, the affine optical flow, interweaved affine MC, and/or phase variant affine MC are disabled.

In all above cases, the "smaller" conditions or "<" can be replaced by "larger" or ">".

In one embodiment, when the fall back mode is used, the affine optical flow, interweaved affine MC, and/or phase variant affine MC are disabled. The translational block based MC is applied without the refinement of the affine optical flow, interweaved affine MC, and/or phase variant affine MC.

In another embodiment, the above affine-based MV refinement methods can be applied depending on affine MV resolution. For example, the condition can be dependent on IMV index, where IMV represent a resolution (e.g., integer, 1/2-pel, 1/4-pel etc.) of the motion vector. The above affine-based MV refinement methods can only be applied when an IMV index is equal to zero, or not equal to zero. Or the above methods can only be applied when IMV index is not equal to 2, or equal to 2.

In another example, the above method can also be used to determine the sub-block size. For example, if the horizontal displacement is too small, the M×N sub-block can be used, where the M is larger than or equal to N, e.g. 8×4 or 4×2. If the vertical displacement is too small, the N×M sub-block can be used, where the M is larger than or equal to N, e.g. 4×8 or 2×4.

In another example, when the motion vectors of sub-blocks are not similar, it might require too many memory bandwidth to load the reference samples for the affine MC and the above methods are also disabled (implicitly). The determination method above can be changed from ">" to "<" or from "<" to ">".

In another embodiment, when the fall back mode is used, the N-tap filter is used for the interpolation. When the fall back mode is not used, the M-tap filter is used for the interpolation. In one example, the N can be 8 and M can be 6 for the luma component. M and N can be 4 for the chroma component.

As mentioned above, PROF is proposed to refine the sub-block based affine motion compensated prediction with optical flow. After the sub-block based affine motion compensation is performed, luma prediction sample (or called predictor) is refined by adding a difference derived by the optical flow equation. BIO utilizes the assumptions of optical flow and steady motion to achieve the sample-level motion refinement. It is applied only for truly bi-directional predicted blocks, which is predicted from two reference frames and one is the previous frame and the other is the latter frame. Above two methods have very similar predictor refinement processes for generating refined subblock predictors. Firstly, the spatial gradients $g_x(i,j)$ and $g_y(i,j)$ of the sub-block prediction are calculated at each sample location using a 3-tap filter, [−1, 0, 1]. Based on optical flow equation, the offsets of x- and y-directions represented by $v_x$ and $v_y$ are derived, respectively. Finally, the luma prediction refinement is calculated by the optical flow equation.

$$\Delta I(i,j) = g_x(i,j) \times \Delta v_x(i,j) + g_y(i,j) \times \Delta v_y(i,j)$$

For hardware friendly implementation, the calculation circuit of luma predictor refinement in PROF and BDOF can be unified if the bit-depth controls between them are similar.

For gradient calculation, PROF proposed in JVET-N0236 uses 1/16-intensity precision (ex. 14 bits if intensity bit-depth is set to 10 bits) and BDOF uses ¼-intensity precision (e.g. 8 bits) to do the calculation. The bit-depth of derived offsets $v_x$ and $v_y$ for BDOF will be clipped to 6 bits after JVET-N0325 was adopted in VTM-5.0. However, the derived offset in PROF is designed to be clipped in 16 bits with 1/32-pixel precision according to JVET-N0236. The final luma prediction refinement will be clipped to 14 bits in PROF.

The following are some methods proposed to modify PROF bit-depth control in order to simplify the computational complexity.

Method 1. Limit the Range of Gradients in PROF

In one embodiment, we propose to limit the range of gradients in a pre-defined bit-depth. If the gradients are larger than the allowed maximum or smaller than the allowed minimum, it is clipped to the allowed value. For example, we can limit the range of gradients into 10 bits. In another embodiment, the range of gradients is limited into 8 bits. The range can be implicitly pre-defined values, depending on the input bit-depth, or explicitly signaled to the decoder at sequence level, picture level, or slice level. In another embodiment, the pre-defined values are aligned with BDOF, or based on BDOF to add an offset. In another embodiment, when the gradients are larger than the allowed maximum or smaller than the allowed minimum, the PROF process is skipped. In another embodiment, those data with gradients larger than the allowed maximum or smaller than the allowed minimum are not used to derive offsets $v_x$ and $v_y$ in PROF process and those pixels are not refined by PROF.

In another embodiment, the gradients of PROF will be right shift by 6 after intensity gradient calculation. The right shift value can be aligned with BDOF gradient calculation, or derived by adding an offset to the right shift value of BDOF gradient calculation or the right shift values are dependent on the input bit-depth. In another embodiment, the gradients can be right shifted first, and then clipped to a pre-defined range. For example, if pre-defined range is 9 bits, the gradients can be right shifted by 3 first, and then be clipped to 9 bits. In another embodiment, the gradients can be limited to a range based on the MSB (most significant bit) to avoid large gradient information loss. For example, the gradients are limited to 8 bits. In this case, only 8 bits after the first MSB will be kept.

Method 2. Limiting the Range of Offsets $v_x$ and $v_y$ (Displacement) in PROF

We propose to limit the range of PROF displacement in some pre-defined bit-depth. In one embodiment, if a displacement is larger than the allowed maximum or smaller than the allowed minimum, it is clipped to the allowed value. For example, we can limit the range of displacement to 6 bits. For example, we can limit the range of displacement to 8 bits. The range can be implicitly pre-defined values, depending on the input bit-depth, or explicitly signaled to the decoder at the sequence level, picture level, or slice level. Alternatively, the pre-defined bit-depth is designed in the same way as the BDOF displacement calculation, or can be derived by adding an offset to the bit-depth of BDOF displacement calculation. In another embodiment, the displacement can be right shifted first, and then clipped to a pre-defined range. For example, if the pre-defined range is 6 bits, the displacement can be right shifted by 3 first, and then be clipped to 6 bits. In another embodiment, the displacement can be limited to a range based on MSB to avoid large displacement information loss. For example, the displacement derived by PROF is limited to 6 bits. In this case, only 6 bits after the first MSB will be kept. In another embodiment, the displacement can be right shifted first, and then be clipped to a pre-defined range. After final luma refinement derivation by the following equation, the refinement value will be left shifted.

$$\Delta I(i,j) = g_x(i,j) \times \Delta v_x(i,j) + g_y(i,j) \times \Delta v_y(i,j)$$

For example, the derived displacement will be right shifted by 1 first to become a lower precision value and then be clipped to 6 bits. After that, it will be multiplied with the intensity gradient to derive the luma refinement, and it will be left shift by 1 bit. The right shift bit number before clipping can be a pre-defined value, depending on the input bitdepth, or explicitly signaled to the decoder at sequence level, picture level, or slice level. The right shift bit number before clipping can be dependent on bit-depth of BDOF displacement calculation, or can be derived by adding an offset to the bit-depth of BDOF displacement calculation.

Method 3. Removing the Limitation of Final Luma Refinement in PROF

To reuse BDOF circuits for PROF, the final luma refinement derived by PROF can be removed. In one embodiment, some bit-depth constraints can be added to PROF in the gradient calculation process or displacement derivation.

Method 4. Conditionally Enabling PROF

To avoid additional circuits for PROF, PROF can be conditionally enabled. In one embodiment, PROF can be enabled only when BDOF and affine are both enabled.

Any of the foregoing proposed methods can be implemented in encoders and/or decoders. For example, any of the proposed methods can be implemented in an affine Inter prediction module of an encoder and/or a decoder. Alternatively, any of the proposed methods can be implemented as a circuit coupled to affine Inter prediction module of the encoder and/or the decoder.

Figure 8:
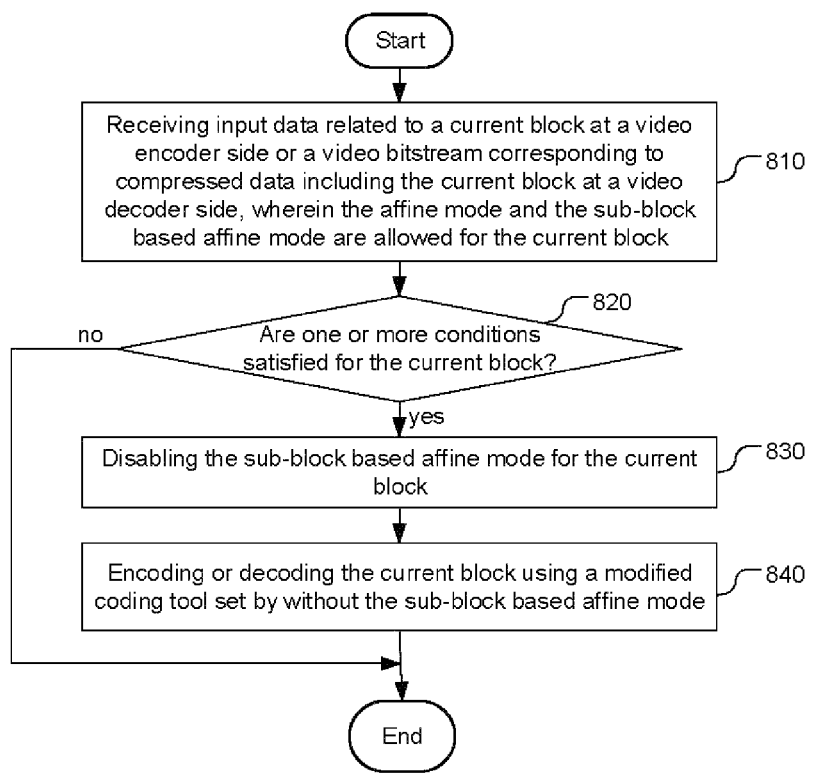
FIG. 8 illustrates an exemplary flowchart for a video coding system utilizing a coding tool set comprising an affine mode and a sub-block based affine mode according to an embodiment of the present invention, where the the sub-block based affine mode is disabled when one or more conditions are satisfied for the current block.

FIG. 8 illustrates an exemplary flowchart for a video coding system utilizing a coding tool set comprising an affine mode and a sub-block based affine mode according to an embodiment of the present invention, where the the sub-block based affine mode is disabled when one or more conditions are satisfied for the current block. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data related to a current block are received at a video encoder side or a video bitstream corresponding to compressed data including the current block is received at a video decoder side in step 810, wherein the affine mode and the sub-block based affine mode are allowed for the current block. Whether one or more conditions are satisfied are determined for the current block in step 820. If said one or more conditions are satisfied for the current block (i.e., the "yes" path from step 820), steps 830 and 840 are performed. Otherwise (i.e., the "no" path from step 820), steps 830 and 840 are skipped. In step 830, the sub block based affine mode is disabled for the current block. In step 840, the current block is encoded or decoded using a modified coding tool set without the sub-block based affine mode.

Figure 9:
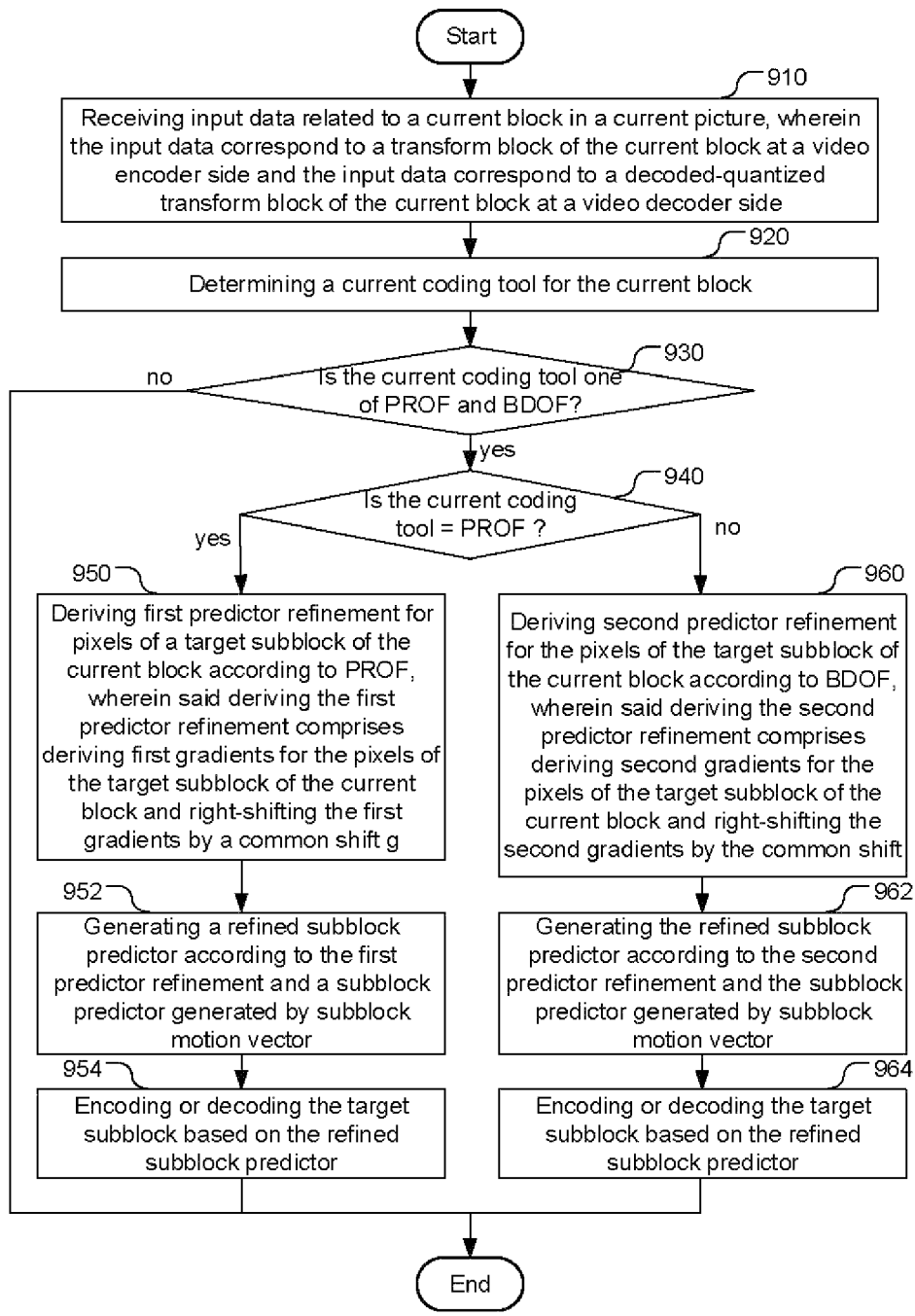
FIG. 9 illustrates an exemplary flowchart for a video coding system utilizing a coding tool belonging to a coding tool group comprising Prediction Refinement with Optical Flow (PROF) and Bi-Directional Optical Flow (BDOF), where the PROF and BDOF share the same gradient shift.

FIG. 9 illustrates an exemplary flowchart for a video coding system utilizing a coding tool belonging to a coding tool group comprising Prediction Refinement with Optical Flow (PROF) and Bi-Directional Optical Flow (BDOF), where the PROF and BDOF share the same gradient shift. According to this method, input data related to a current block in a current picture are received in step 910, wherein the input data correspond to a transform block of the current block at a video encoder side and the input data correspond to a decoded-quantized transform block of the current block at a video decoder side. A current coding tool for the current block is determined in step 920. Whether the current coding tool corresponds to one of the PROF and BDOF is determined in step 930. If the current coding tool corresponds to one of the PROF and BDOF (i.e., the "yes" path from step 930), a further testing regarding whether the current coding tool corresponds to PROF or BDOF in step 940. If the current coding tool corresponds to PROF, the process goes to step 950. If the current coding tool corresponds to BDOF, the process goes to step 960. If the current coding tool is not to one of the PROF and BDOF (i.e., the "no" path from step 930), the process goes to "end". In step 950, first predictor refinement is derived for pixels of a target subblock of the current block according to PROF, said deriving the first predictor refinement comprises deriving first gradients for the pixels of the target subblock of the current block and right-shifting the first gradients by a common shift. In step 952, a refined subblock predictor is generated according to the first predictor refinement and a subblock predictor generated by subblock motion vector. In step 954, the target subblock is encoded or decoded based on the refined subblock predictor. In step 960, second predictor refinement is derived for the pixels of the target subblock of the current block according to BDOF, wherein said deriving the second predictor refinement comprises deriving second gradients for the pixels of the target subblock of the current block and right-shifting the second gradients by the common shift. In step 962, the refined subblock predictor is generated according to the second predictor refinement and the subblock predictor generated by subblock motion vector. In step 964, the target subblock is encoded or decoded based on the refined subblock predictor.

The flowcharts shown are intended to illustrate an example of video according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of prediction for video coding performed by a video encoder or a video decoder that utilizes a coding tool set comprising an affine mode and a sub-block based affine mode, the method comprising:
receiving input data related to a current block at a video encoder side or a video bitstream corresponding to compressed data including the current block at a video decoder side, wherein the affine mode and the sub-block based affine mode are allowed for the current block;
determining whether one or more conditions are satisfied for the current block;
if said one or more conditions are satisfied for the current block:
disabling the sub-block based affine mode for the current block; and
encoding or decoding the current block using a modified coding tool set without the sub-block based affine model
wherein:
when the current block uses a 4-parameter affine model, said one or more conditions comprise a target condition corresponding to a first control-point motion vector at top-left location of the current block equal to a second control-point motion vector at top-right location of the current block, or
when the current block uses a 6-parameter affine model, said one or more conditions comprise a target condition corresponding to a first control-point motion vector at top-left location of the current block equal to a second control-point motion vector at top-right location of the current block and the first control-point motion vector at the top-left location of the current block equal to a third control-point motion vector at bottom-left location of the current block.

2. The method of claim 1, wherein said one or more conditions comprise a target condition corresponding to an affine fallback mode being selected for the current block.

3. The method of claim 1, wherein the sub-block based affine mode corresponds to Prediction Refinement with Optical Flow (PROF) mode.

4. The method of claim 1, wherein the current block is encoded or decoded using the affine mode if said one or more conditions are satisfied for the current block.

5. An apparatus for Inter prediction for video coding performed by a video encoder or a video decoder that utilizes a coding tool set comprising an affine mode and a sub-block based affine mode, the apparatus comprising one or more electronic circuits or processors arranged to:
receive input data related to a current block at a video encoder side or a video bitstream corresponding to compressed data including the current block at a video decoder side, wherein the affine mode and the sub-block based affine mode are allowed for the current block;
determine whether one or more conditions are satisfied for the current block;
if said one or more conditions are satisfied for the current block:
disable the sub-block based affine mode for the current block; and
encode or decode the current block using a modified coding tool set without the sub-block based affine mode;
wherein:
when the current block uses a 4-parameter affine model, said one or more conditions comprise a target condition corresponding to a first control-point motion vector at top-left location of the current block equal to a second control-point motion vector at top-right location of the current block, or
when the current block uses a 6-parameter affine model, said one or more conditions comprise a target condition corresponding to a first control-point motion vector at top-left location of the current block equal to a second control-point motion vector at top-right location of the current block and the first control-point motion vector at the top-left location of the current block equal to a third control-point motion vector at bottom-left location of the current block.

6. A method of video coding using a coding tool belonging to a coding tool group comprising Prediction Refinement with Optical Flow (PROF) and Bi-Directional Optical Flow (BDOF), the method comprising:
receiving input data related to a current block in a current picture, wherein the input data correspond to a transform block of the current block at a video encoder side or the input data correspond to a decoded-quantized transform block of the current block at a video decoder side;
determining a current coding tool for the current block;
if the current coding tool corresponds to the PROF:
deriving first predictor refinement for pixels of a target subblock of the current block according to PROF, wherein said deriving the first predictor refinement comprises deriving first gradients for the pixels of the target subblock of the current block and right-shifting the first gradients by a common shift;
generating a refined subblock predictor according to the first predictor refinement and a subblock predictor generated by subblock motion vector; and
encoding or decoding the target subblock based on the refined subblock predictor; and
if the current coding tool corresponds to the BDOF:
deriving second predictor refinement for the pixels of the target subblock of the current block according to BDOF, wherein said deriving the second predictor refinement comprises deriving second gradients for the pixels of the target subblock of the current block and right-shifting the second gradients by the common shift;
generating the refined subblock predictor according to the second predictor refinement and the subblock predictor generated by subblock motion vector; and
encoding or decoding the target subblock based on the refined subblock predictor.

7. The method of claim 6, wherein the common shift is equal to 6.

8. An apparatus of video coding using a coding tool belonging to a coding tool group comprising Prediction Refinement with Optical Flow (PROF) and Bi-Directional Optical Flow (BDOF), the apparatus comprising one or more electronic circuits or processors arranged to:
receive input data related to a current block in a current picture, wherein the input data correspond to a transform block of the current block at a video encoder side or the input data correspond to a decoded-quantized transform block of the current block at a video decoder side;

determine a current coding tool for the current block;
if the current coding tool corresponds to the PROF:
derive first predictor refinement for pixels of a target subblock of the current block, wherein a step to derive the first predictor refinement comprises to derive first gradients for the pixels of the target subblock of the current block and to right-shift the first gradients by a common shift;
generate a refined subblock predictor according to the first predictor refinement and a subblock predictor generated by subblock motion vector; and
encode or decode the target subblock based on the refined subblock predictor; and
if the current coding tool corresponds to the BDOF:
derive second predictor refinement for the pixels of the target subblock of the current block, wherein the step to derive the second predictor refinement comprises to derive second gradients for the pixels of the target subblock of the current block and to right-shift the second gradients by the common shift;
generate the refined subblock predictor according to the second predictor refinement and the subblock predictor generated by subblock motion vector; and
encode or decode the target subblock based on the refined subblock predictor.

* * * * *